United States Patent [19]

Lefsky et al.

[11] Patent Number: 4,949,249

[45] Date of Patent: Aug. 14, 1990

[54] CLOCK SKEW AVOIDANCE TECHNIQUE FOR PIPELINE PROCESSORS

[75] Inventors: Brian Lefsky, West Newton; Joseph L. Ardini, Jr., Needham; Michael Schwartz, Milford, all of Mass.

[73] Assignee: Prime Computer, Inc., Natick, Mass.

[21] Appl. No.: 390,471

[22] Filed: Aug. 3, 1989

Related U.S. Application Data

[63] Continuation of Ser. No. 36,909, Apr. 10, 1987, abandoned.

[51] Int. Cl.⁵ .............................................. G06F 13/00
[52] U.S. Cl. .................................. 364/200; 371/1; 364/231.8; 364/271; 364/239; 364/239.51; 364/247; 364/260; 364/260.2; 364/259; 364/259.5
[58] Field of Search ............... 364/200 MS, 900 MS; 371/1

[56] References Cited

U.S. PATENT DOCUMENTS

| 3,753,241 | 8/1973 | Bayne .................................. 364/900 |
| 4,229,790 | 10/1980 | Gilliland et al. .................... 364/200 |
| 4,392,200 | 7/1983 | Arulpragasam et al. ........... 364/200 |
| 4,566,062 | 1/1986 | Ohnishi et al. ..................... 364/200 |
| 4,809,162 | 2/1989 | Si ........................................ 364/200 |
| 4,811,364 | 3/1989 | Sager et al. ........................ 371/1 |

*Primary Examiner*—Gareth D. Shaw
*Assistant Examiner*—Rebecca L. Rudolph
*Attorney, Agent, or Firm*—Wolf, Greenfield & Sacks

[57] ABSTRACT

A technique for providing skew compensation particularly in association with a pipelined processor. The skew occurs between first and second clock signals. The skew compensation technique of the invention provides for the proper transfer of information between stages even though the clock signals may have a skew greater than the inter-stage delay. A holding or latching means is provided between stages so as to hold the previous stage data for clocking into the subsequent stage register.

2 Claims, 2 Drawing Sheets

CLOCK SKEW AVOIDANCE TECHNIQUE FOR PIPELINE PROCESSORS

This application is a continuation, of application Ser. No. 07/036,909, filed 04-10-87 now abandoned.

BACKGROUND OF THE INVENTION

I. Field of the Invention

The present invention relates in general to a technique for compensating for clock skew in a data-processing system. More particularly, the invention relates to a clock skew compensation system for use in pipelined processors.

II. Background Discussion

In implementing a pipelined processor there is typically provided multiple sequential stages each including a pipeline or staging register. These registers are triggered by separate clock signals and typically have a datapath between them comprising combinatorial logic. With the use of high-speed digital logic circuitry, errors have been created when clocking data from one stage to the next. The errors are brought about because the separate clock signals may have an inherent skew relationship there-between. If this skew delay is greater than the minimum time required to propagate through the stage, erroneous data is registered in the staging register.

The clock skew that occurs can be attributed to a number of different factors. For example, there may be variations in the manufacturing process of the clock driver. There may be variations in skew that occur with temperature and fluctuations in voltage. In addition, each clock driver can have a different delay associated therewith based on, for example, when it was manufactured. Another component of clock skew is the difference between the physical distance each clock signal travels on the circuit board before reaching the corresponding staging register.

As digital logic becomes faster, the internal component delays become significantly faster than the on or off chip (clock driver) delays. This exaggerates the skew problem because the stage clocks derived from the clock driver are experiencing greater relative delays while the propagation delay of the internal stage logic is reduced. This trend makes it difficult to manage the problem of guaranteeing that the data from the staging register at the beginning of the stage does not change, propagate through the stage and reach the staging register at the other end of the stage, before the previous state information is registered. This skew problem is most difficult if the two staging registers and the stage logic are all resident in the same VLSI component.

OBJECTS OF THE INVENTION

Accordingly, it is an object of the present invention to provide a system for compensating for clock skew in a data-processing system.

Another object of the present invention is to provide a clock skew compensation system that in particular is adapted for use in a pipelined processor application.

Still another object of the present invention is to provide a clock skew compensation system in accordance with the preceeding objects and that requires the addition of a minimum amount of logic while at the same time compensating for relatively larger amounts of clock skew.

SUMMARY OF THE INVENTION

To accomplish the foregoing and other objects, features, and advantages of the invention there is provided a system for providing compensation for the skew of separate clock signals as particularly applied in a pipelined processor in which there are multiple sequential stages including at least first and second stage register means. These stage register means each have means for receiving respective first and second clock signals for clocking information into each stage. The clock skew compensation system of the invention provides for the proper transfer of information between stages even though the clock signals may have a skew greater than the inter-stage delay. In accordance with the invention, there is provided a latch means or holding means and means for coupling of the latch means or holding means between the first and second stage register means. The latch means has means for receiving either the first or second clock signals as a latching command thereto. The latch means has one state in which information is permitted to pass between stages and another state for holding the information from the first stage register means for the second stage register means.

In accordance with the invention, there is disclosed herein two alternate embodiments thereof. However, it is understood that other embodiments are also contemplated as falling within the scope of this invention. In accordance with one embodiment, the first stage register means includes a first register having a clock input and the latch means includes a latch having an enable input. The first clock signal couples in common to both the register clock input and the latch enable input. The latch in this example has a low logic level enable input. In accordance with the other version of the invention, the second stage register means includes a second register having a clock input and the latch means includes a latch having an enable input. The second clock signals couples in common to both the second register clock input and the latch enable input. In this embodiment the latch enable input is a high logic level enable input.

BRIEF DESCRIPTION OF THE DRAWINGS

Numerous other objects, features, and advantages of the invention should now become apparent upon a reading of the following detailed description taken in conjunction with the accompanying drawings, in which.

DETAILED DESCRIPTION

Figure 1:
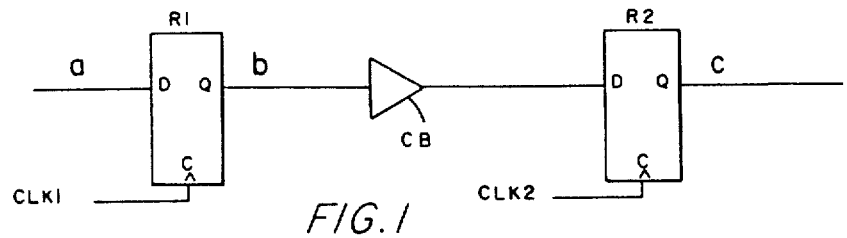
FIG. 1 illustrates two stages of a pipelined computer architecture illustrating separate clocking signals to each of the pipeline or staging registers.

Pipeline processing is a technique of essentially separating a sequential process into sub-processes with each sub-process being executed in a special dedicated segment that operates concurrently with all other segments. A pipeline can be considered as a collection of processing segments through which binary information flows. In this connection FIG. 1 illustrates a portion of a pipelined computer architecture implemented using registers R1 and R2 to hold the data between pipeline stages. In FIG. 1 the pipeline or staging registers R1 and R2 are triggered by separate clock signals. More particularly, the register R1 receives the clock signal CLK1 while the register R2 receives the clock signal CLK2. Truth tables for these registers are described hereinafter in association with Table V. Also illustrated in FIG. 1 is a datapath between the registers R1 and R2, which datapath includes combinatorial logic as illustrated at CB. It is noted that in addition to the clock input to each of the registers R1 and R2 there is also a data input D and a data output Q.

Figure 2:
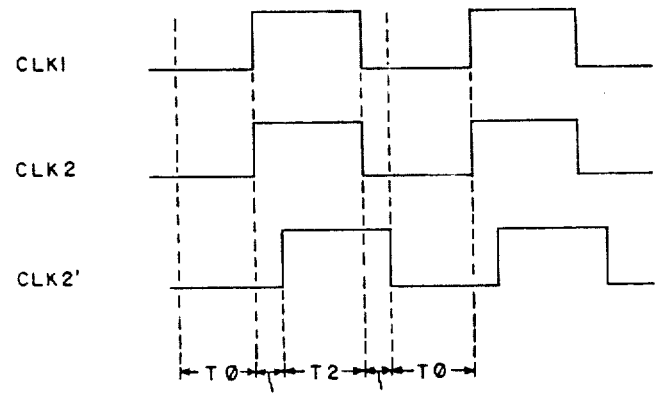
FIG. 2 is a timing diagram illustrating clock signals and associated clock skew.

With reference to the circuit of FIG. 1, FIG. 2 is also to be noted. FIG. 2 shows three waveforms of clock signals at a 50 percent duty cycle. The first two signals are the signals CLK1 and CLK2 which couple, respectively, to the clock inputs of the registers R1 and R2. The triggering of the two registers normally occurs simultaneously as shown by the timing diagram of FIG. 2 displaying the clock signals CLK1 and CLK2. This triggering occurs on the rising edge of the two clock signals. When the registers are clocked, new data is captured in each register advancing the pipeline by one stage.

With regard to the diagram of FIG. 1, as long as the two clock signals CLK1 and CLK2 are in phase as illustrated in FIG. 2, then the clocking through the pipeline operates properly. However, a problem arises when the clock signal CLK2 is retarded with respect to the clock signal CLK1 by a delay greater than the sum of the CLK2 output delay of register R1, along with the datapath delay between registers as well as the setup time of register R2. This case most often occurs when the signal CLK2 is skewed later in time than the signal CLK1 due to, for example, manufacturing tolerances, while at the same time the datapath delay between the registers is very small. With regard to the delayed clock signal refer to FIG. 2 for an illustration of the delayed clock signal CLK2'. In FIG. 2 also illustrated are the various periods of time of interest in the juxtaposition of clock signals CLK1 and CLK2'. In FIG. 2 these time periods are labelled as time periods T0 through T3.

In FIG. 2 the time period that is of most interest is the time period T1. This represents the difference between the arrival of the triggering edge of the clock signal CLK1 and the clock signal CLK2'. This represents the time delay between the receipt of these clock signals at the respective registers. This is referred to as clock skew.

In connection with the circuit of FIG. 1, reference is now made to Tables I and II set forth hereinbelow:

TABLE I

| For T1 < CLK→ data + datapath delay + setup time | | | |
|---|---|---|---|
| a | b | c | Time |
| Da | Db | Dc | T0 |
|  | Da | Dc | T1 |
|  | Da | Db | T2 |
|  | Da | Db | T3 |
| Da + 1 | Da | Db | T0 |

TABLE II

| For T1 > CLK→ data + datapath delay + setup | | | |
|---|---|---|---|
| a | b | c | Time |
| Da | Db | Dc | T0 |
|  | Da | Dc | T1 |

TABLE II-continued

| For T1 > CLK→ data + datapath delay + setup | | | |
|---|---|---|---|
| a | b | c | Time |
|  | Da | Da | T2 |
|  | Da | Da | T3 |
|  | Da | Da | T0 |

Table I represents a skew period T1 that is less than the CLK2 output delay in register R1, the datapath delay between registers, and the setup time of register R2. Table II represents a skew period greater than the CLK2 output delay in register R1, the datapath delay between registers, and the setup time of register R2 (hereinafter collectively referred to as "inter-stage delay").

Table I indicates the clock skew in a condition in which the skew is not of sufficient magnitude to create any problem. Thus, when the length of the period T1 is less than the inter-stage delay, the output of register R2 at position [c] changed correctly from data Dc to data Db during a cycle. In other words, at the time that the register R2 is clocked even though there is a delay from the clocking of register R1, the delay is small enough so that the data has not changed as presented to the input of register R2.

Reference is now made to Table II for an illustration of the example in which the skew is greater than the inter-stage delay. In this case the data Db is modified into the data Da before it is captured in register R2, and the result is that the output of register R2 as indicated at position [c] illustrates that register R2 has lost the value of data Db and has skipped to the data Da at the end of a cycle. In this regard refer in Table II to the column representing position [c] which corresponds to the output of the register R2. It is noted in that column that the data, through one cycle, changes from data Dc to data Da. Again, the clocking has created an error which is the loss of the data Db.

Thus, while Table I represents normal data transfer in a system as described in FIG. 1, Table II represents an error that can be developed because of the clock skew. It is the purpose of the present invention, as embodied in either of the illustrations of FIGS. 3 or 4, to provide a technique that virtually eliminates the skew problem associated with staging the pipelined data. This involves the addition of a latch L1 into the pipeline stage for isolating the stage's state from transitions on the stage clock. The latch L1 may be referred to as an anti-skew latch.

Figure 3:
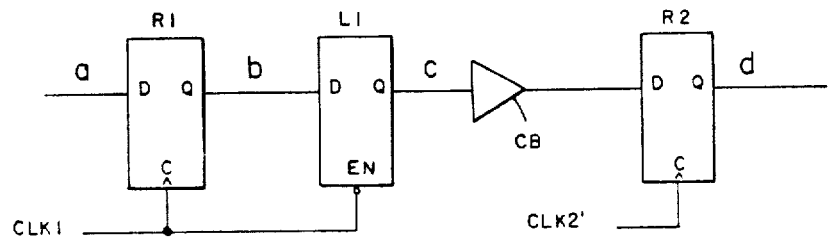
FIG. 3 is a block diagram illustrating a first embodiment of the present invention employing a latch between pipeline or staging registers.
Figure 4:
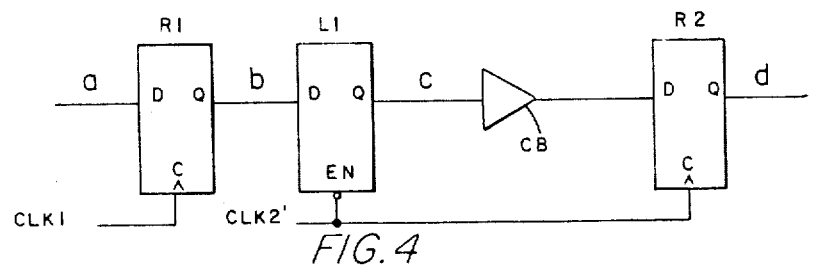
FIG. 4 is a block diagram of an alternate embodiment of the invention also employing a latch between pipeline or staging registers.

As illustrated in FIGS. 3 and 4, the latch L1 is placed immediately after the staging register R1 at the beginning of the stage. This anti-skew latch is controlled in two manners. FIG. 3 illustrates the latch being controlled by the same clock signal that controls the register R1. This is the clock signal CLK1. In the embodiment of FIG. 4 the latch L1 is shown as being controlled from the same clock signal directed to the register R2. This is the clock signal CLK2'.

Reference is now made to FIG. 3 and to Table III for an illustration of the manner in which data is sequenced for one clock cycle. The positions [a]-[d] in Table III relate to the corresponding positions in the circuit as illustrated in FIG. 3. Table III also shows the logic level of the clock signals CLK1 and CLK2'. Also set forth in Table III are the time periods T0-T3.

TABLE III

| a | b | c | d | Time | CLK1 | CLK2' |
|---|---|---|---|---|---|---|
| Da | Db | Db | Dc | T0 | L | L |
|  | Da | Db | Dc | T1 | H | L |
|  | Da | Db | Db | T2 | H | H |
|  | Da | Da | Db | T3 | L | H |
| Da + 1 | Da | Da | Db | T0 | L | L |

In the embodiment of the invention illustrated in FIG. 3, it is noted that the latch L1 has a low logic level enable. This input receives the clock signal CLK1. In connection with the latch L1 of FIG. 3, refer also to the Truth Table VI illustrated hereinafter. It is noted that when the enable input thereto is at a low logic level, the latch is essentially transparent with the data at the input appearing at the output. If the signal at the enable input is at a high logic level, then the previous data is latched.

In association with the embodiment of FIG. 3, refer also to Table III. During time period T0 the latch L1 is open and thus the data Db is resident both at the output of register R1 as well as at the output of latch L1.

During time period T1, at the positive going transition of the clock signal CLK1, new data Da is clocked into register R1. At the same time the latch L1 closes or latches holding the data Db. In this regard, refer to Table III during the time period T1.

During time period T2 the data Db remains held in the latch L1 and the register R2 is clocked. This causes the new data Db to be latched to the output of register R2. Again, refer to the time period T2 in Table III.

During time period T3 the latch L1 opens allowing new data Da to flow therethrough. The circuit is now ready for the next clock cycle.

It is noted in Table III that in position [d] the data appearing there has thus been clocked from data Dc to data Db. During the next cycle this will transition to the data Da, etc. It is noted in Table III that there is no erroneous data clocked through the pipeline. The pipeline operation is insensitive to skews up to one-half of a cycle in duration assuming a 50 percent duty cycle as illustrated.

An alternate embodiment of the invention is illustrated in FIG. 4 employing a latch L1 with a high logic level enable input. This input is tied to the same clock signal that clocks the register R2. As illustrated in FIG. 4, this is the signal CLK2'. In connection with FIG. 4 also refer to Table IV for an illustration of the data in the four positions [a]-[d]. These positions relate to the positions in the circuit of FIG. 4. Table IV also shows the representative time periods and the logic level of the clock signals.

TABLE IV

| a | b | c | d | Time | CLK1 | CLK2' |
|---|---|---|---|---|---|---|
| Da | Db | Db | Dc | T0 | L | L |
|  | Da | Db | Dc | T1 | H | L |
|  | Da | Da | Db | T2 | H | H |
|  | Da | Da | Db | T3 | L | H |
| Da + 1 | Da | Da | Db | T0 | L | L |

With further reference to FIG. 4 and also the time periods in Table IV, during time period T0 the latch L1 is closed holding the same data that appears at the output of register R1, namely data Db. In Table IV note that at locations [b] and [c] there appears the data Db.

During time period T1 the clock signal CLK1 transitions to its high state. This clocks the register R1 and the data Da appears at the output of register R1, identified in Table IV as position [b]. The latch L1 remains closed holding the data Db at position [c].

During period T2 there is initially a low-to-high transition of the clock signal CLK2'. This clocks the data Db into register R2 and thus at the output of register of R2 at position [d] appears the data Db. In this regard, refer again to Table IV. During this time period the latch L1 now opens so that the same data appears at positions [b] and [c], namely data Da.

During the time period T3, as noted in Table IV, there is no change in the status of the data at the various positions indicated. During the subsequent time period T0, latch L1 again closes holding the data Da, in preparation for the next cycle.

With respect to the registers R1 and R2 as well as the anti-skew latch L1, reference may now be made to the following Tables V, VI, and VII.

TABLE V

|  | Register | |
|---|---|---|
| D | C | Q |
| X | H | — |
| X | L | — |
| X | H→L | — |
| L | L→H | L |
| H | L→H | H |

TABLE VI

|  | Latch, Low Enable | |
|---|---|---|
| D | EN | Q |
| X | H | — |
| H | L | H |
| L | L | L |

TABLE VII

|  | Latch, High Enable | |
|---|---|---|
| D | EN | Q |
| X | L | — |
| H | H | H |
| L | H | L |

In connection with the above Truth Tables, the following definitions apply:

H = Logic High
L = Logic Low
X = Don't Care
— = No Change
L→H = Low to High Transition
H→L = High to Low Transition Table V is the Truth Table for either of the registers R1 or R2. This table clearly indicates that the data appearing in the input is clocked on a positive transition to the output.

Table VI is the Truth Table for the anti-skew latch illustrated in FIG. 3. This latch has a low enable. The Truth Table indicates that when the enable input is at a logic low level then the latch is essentially transparent. When the enable input is at a high logic level, then the input signal is latched at the output and is held in the latched state.

The Table VII is a Truth Table associated with the anti-skew latch used in the embodiment of FIG. 4. This has a high logic level enable input. In this Truth Table it is noted that when this enable input is at a high logic level state, that the latch is transparent, or in other words open. When the enable input is at a low logic level state, then this indicates that the previous state at the time of the transition is latched or held and will not change regardless of the logic level at the input terminal to the latch.

Figure 5:
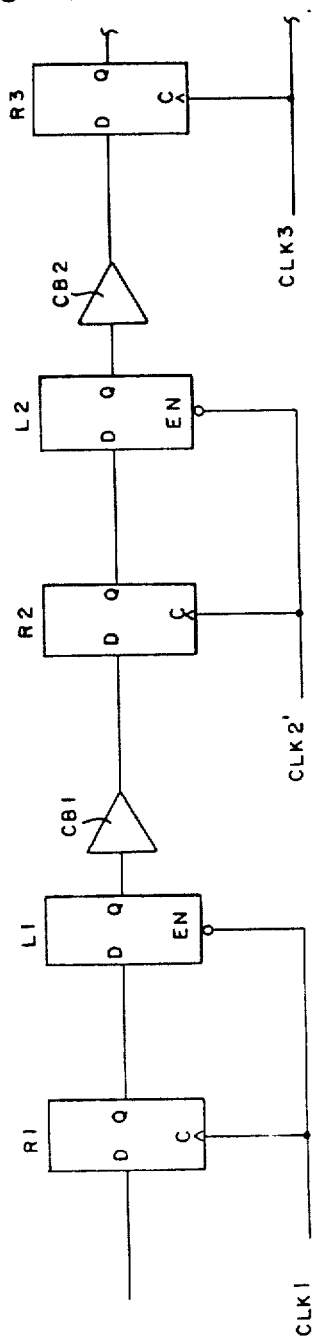
FIG. 5 illustrates the principles of the present invention as applied with more than two registers.

Reference is now made to the block diagram of FIG. 5. This is illustrated simply to show the use of the anti-skew latch of the present invention in association with each of the stages. Thus, there is a first anti-skew latch L1 associated with register R1 and clocked from the clock signal CLK1. Similarly, there is a second anti-skew latch L2 associated with the register R2 and clocked from the signal CLK2'. Also illustrated is the third clock signal CLK3 coupling to register R3. Latch L2 assures against any skew problem that may be present between the clock signals CLK2' and CLK3.

Thus, in accordance with the invention it has been demonstrated than when the skew between clock signals is such that the first clock is ahead of the second clock then the anti-skew latch holds the data until the second clock arrives at the register. On the other hand, if the second clock arrives before the first clock, opposite to that illustrated in FIG. 2, the latch is open. This is not a problem because the staging register at the beginning of this stage has not yet been triggered. Because in any one system it is difficult to ascertain whether there will be a lead or lag between clock signals, by use of the anti-skew latch concepts of the present invention one need not concern oneself with these skew problems. As indicated previously, the anti-skew latch compensates for skews up to one-half of a cycle in duration assuming a 50 percent clock duty cycle.

Having now described a limited number of embodiments of the present invention, it should now be apparent to those skilled in the art that numerous other embodiments and modifications thereof are contemplated as falling within the scope of the present invention as defined by the appended claims. For example, there has been described herein, a pipelined processor system in which it has been assumed that data flow occurs from stage to stage. The concepts of the present invention may also be applied in association with a processing scheme for instruction flow.

What is claimed is:

1. A pipelined processor comprising M sequential stages of combinational logic for performing M steps of pipelined processing, where M is greater than one, a clock signal associated with each stage, each of said M stages having combinational logic including an output terminal, M registers, each of said M registers associated with one of said M stages and having an input terminal coupled to receive an output signal from said output terminal of said combinational logic of the immediately preceding stage, a clock input terminal coupled to receive said clock signal associated with said stage, and an output terminal, M latches, each latch associated with one of said M stages and having an output terminal coupled to an input terminal of said combinational logic associated with said stage, an input terminal coupled to the output terminal of said register associated with said stage, and an enable input terminal coupled to receive said clock signal associated with said stage, said clock signal having first and second states, said M registers activated to pass data when said associated clock signal is in said first state and to hold data when said associated clock signal is in said second state and said M latches activated to pass data when said clock signal is in said associated second state and to hold data when said associated clock signal is in said first state.

2. A pipelined processor comprising M sequential stages of combinational logic for performing M steps of pipelined processing, where M is greater than one, a clock signal associated with each stage, each of said M stages having combinational logic including an output terminal, M registers, each of said M registers associated with one of said M stages and having an input terminal coupled to receive an output signal from said output terminal of said combinational logic of the immediately preceding stage, a clock input terminal coupled to receive said clock signal associated with said stage, and an output terminal, M latches, each latch associated with one of said M stages and having an output terminal coupled to an input terminal of said combinational logic associated with said stage, an input terminal coupled to the output terminal of said register, and an enable input terminal coupled to receive said clock signal of the next succeeding stage of said pipelined processor, said clock signals comprising first and second states, said M registers and said M latches activated to pass data when said clock signal input thereto is in said first state and to hold data when said clock signal input thereto is in said second state.

* * * * *